Jan. 1, 1957 T. W. KALBOW ET AL 2,775,819

METHOD OF AND APPARATUS FOR USE IN ALIGNING PARTS

Filed June 4, 1953 3 Sheets-Sheet 1

INVENTORS
T. W. KALBOW
L. O. REICHELT
BY C. B. Hamilton.
ATTORNEY

INVENTORS
T. W. KALBOW
L. O. REICHELT
BY C. B. Hamilton
ATTORNEY

METHOD OF AND APPARATUS FOR USE IN ALIGNING PARTS

Filed June 4, 1953

INVENTORS
T. W. KALBOW
L. O. REICHELT
BY C. B. Hamilton
ATTORNEY

United States Patent Office 2,775,819

Patented Jan. 1, 1957

2,775,819

METHOD OF AND APPARATUS FOR USE IN ALIGNING PARTS

Theodore W. Kalbow, Chicago, and Lester O. Reichelt, Naperville, Ill., assignors to Western Electric Company, Incorporated, New York, N. Y., a corporation of New York Application June 4, 1953, Serial No. 359,586

6 Claims. (Cl. 33—174)

This invention relates to a method of and apparatus for angularly aligning parts relative to each other and marking a line across the juncture of the parts after they have been aligned.

It is an object of the present invention to provide a simple and effective method of and apparatus for angularly aligning parts rotatably supported one on another.

It is a further object of the present invention to provide an improved method of and apparatus for angularly aligning parts rotatably abutting each other and marking a reference line across the juncture of the aligned parts.

In accordance with one embodiment of the invention as related to the fabrication of magnetrons, a type of vacuum tube, wherein a tuning component is rotatably supported on a body component of the magnetron and has a plurality of pins of one diameter extending from one end thereof into a plurality of cylindrical cavities of a larger diameter formed in the body component and arranged in a circle and it is necessary to angularly adjust the tuning component relative to the body component to coaxially align the pins in the cavities, the first step in the method is to turn the tuning component in one direction to a first position with the pins in engagement with one side of the walls of the cavities and note the position of the tuning component on a dial indicator gage, then turn the tuning component in a reverse position to a second position with the pins in engagement with the opposite side of the walls of the cavities and note the position of the tuning component as indicated on the dial indicator gage, then move the tuning component to a position midway between the first and second positions as indicated by the dial indicator gage, and then scribe a line across the juncture of the two components.

Mechanism is provided including a holder for supporting the components of the magnetron, a dial indicator gage engageable with an abutment on the tuning component for indicating the movement of the abutment during the adjustment of the tuning component, and a scribing device for scribing a line across the juncture of the components after they have been angularly aligned.

Other objects and advantages of the invention will become apparent by reference to the following detailed description and the accompanying drawings illustrating a preferred embodiment thereof, in which.

Figure 5:
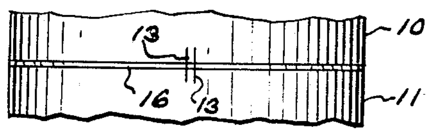
Fig. 5 is an elevational view of a portion of two components of the magnetron showing a pair of lines scribed across the juncture of the components.

The present fixture is designed to facilitate the angular adjustment of a tuning component 10 on a body component 11 of a magnetron 12 to a predetermined aligned position relative to each other and scribe one or more lines 13 across the intersection of the components 10 and 11 (Fig. 5), whereby the alignment of the components 10 and 11 may be checked prior to the brazing together of the components in a brazing apparatus.

Figure 4:
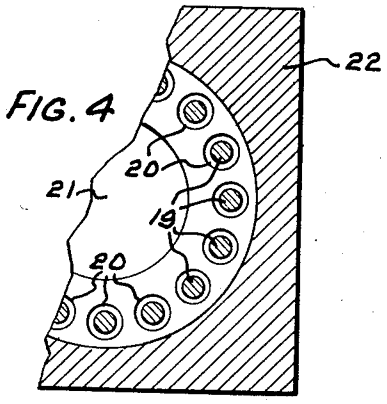
Fig. 4 is a fragmentary plan section through the magnetron taken on the line 4—4 of Fig. 1.

The component 10 has a cylindrical shell 14 which rests on the end of a cylindrical shell portion 15 of the component 11, the meeting edges of the shells 14 and 15 being rabbeted and forming a juncture 16 with a ring of brazing material therein. The component 10 has a cylindrical member 18 mounted thereon, which is held against rotation relative thereto, and the member 18 has a plurality of cylindrical pins 19 extending from one end thereof into cylindrical cavities 20 in the component 11. The pins 19 and the cavities 20 (Fig. 4) are arranged in a circle concentric with the axis 22 of the cylindrical shells 14 and 15 and are spaced equi-distant from the axis and in a predetermined spaced relation one to another. The diameter of the cavities 20 is larger than the diameter of the pins 19. The component 11 of the magnetron has a pair of rectangular pole pieces 22 mounted on opposite sides of a member 23 and has other parts secured thereto which are not pertinent to the disclosure of the invention and accordingly will not be described. In the fabrication of the magnetron, it is essential that the component 10 be angularly adjusted on the component 11 so that the pins 19 are coaxially aligned with the cavities 20 prior to and during the brazing of the components to each other.

Figure 1:
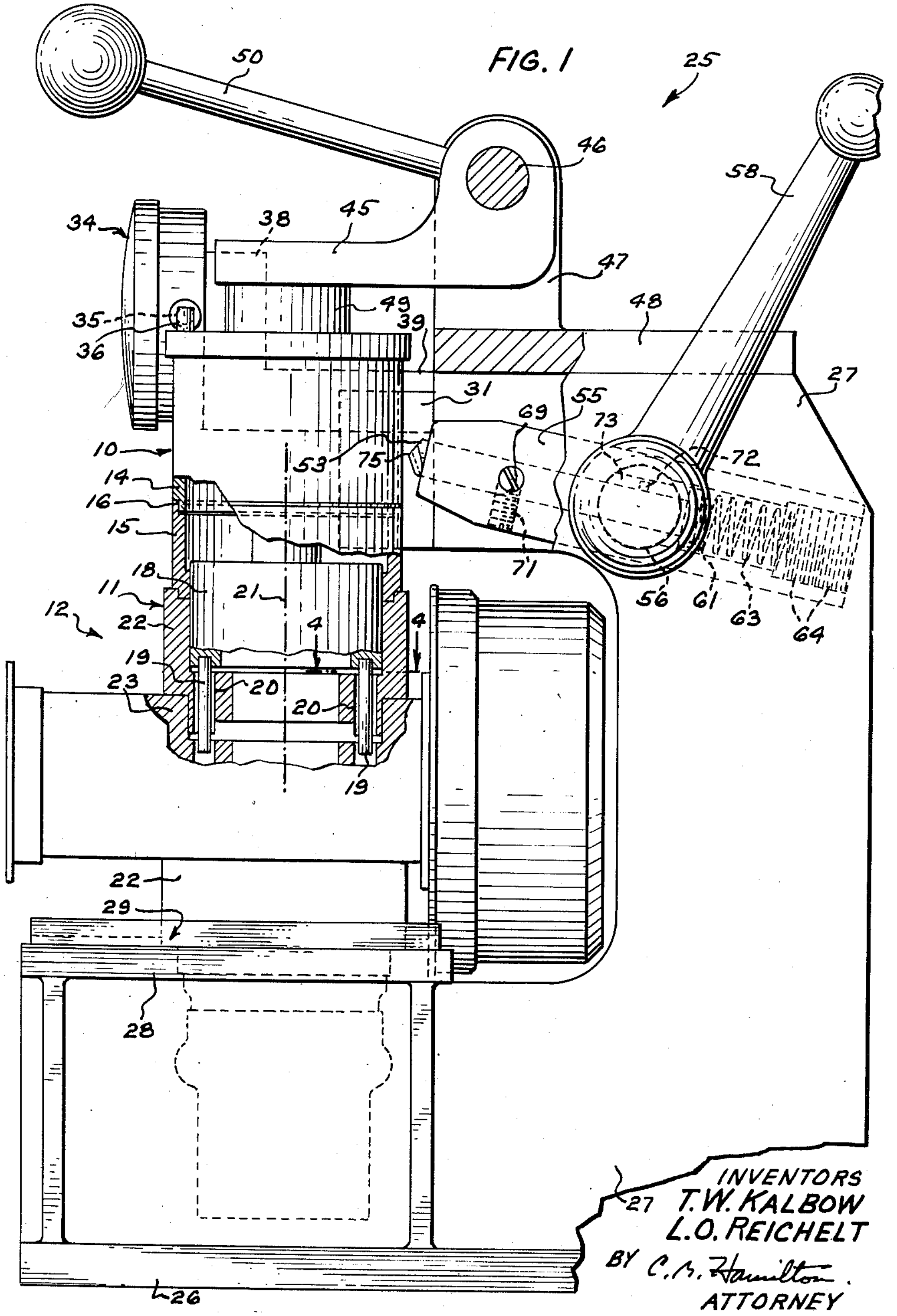
Fig. 1 is a side elevational view of the apparatus with a magnetron in position thereon with parts broken away and parts shown in section.

The apparatus 25 for supporting the magnetron 12 during the relative adjustment of the components 10 and 11 and for scribing the lines 13 across the juncture of the components comprises a base plate 26 on which is mounted a pair of vertically extending frame plates 27 in spaced relation to each other. The frame plates 27 have portions 28 thereof provided with a pair of seats 29 forming a nest for receiving a pole piece 22 therein for supporting the magnetron 12 with the axis 21 disposed in a vertical position (Fig. 1) and to hold the component 11 thereof against turning movement about the axis. A pair of gage blocks 31 mounted on the upper portion of the frame plates 27 are engageable with the cylindrical shells 14 and 15 for supporting the upper portion of the magnetron against lateral displacement.

To angularly adjust the component 10 on the component 11 of the magnetron so as to coaxially align the pins 19 with the cavities 20, the component 10 is manually rotated in one direction to a first position with the pins 19 in engagement with one portion of the walls of the cavities, after which the component 10 is turned in the opposite direction to a second position with the pins 19 in engagement with the opposite walls of the cavities 20 and then the component 10 is turned to a position midway between the first and second positions to move the pins 19 midway between the opposite walls of and in coaxial alignment with the cylindrical cavities 20.

Figure 2:
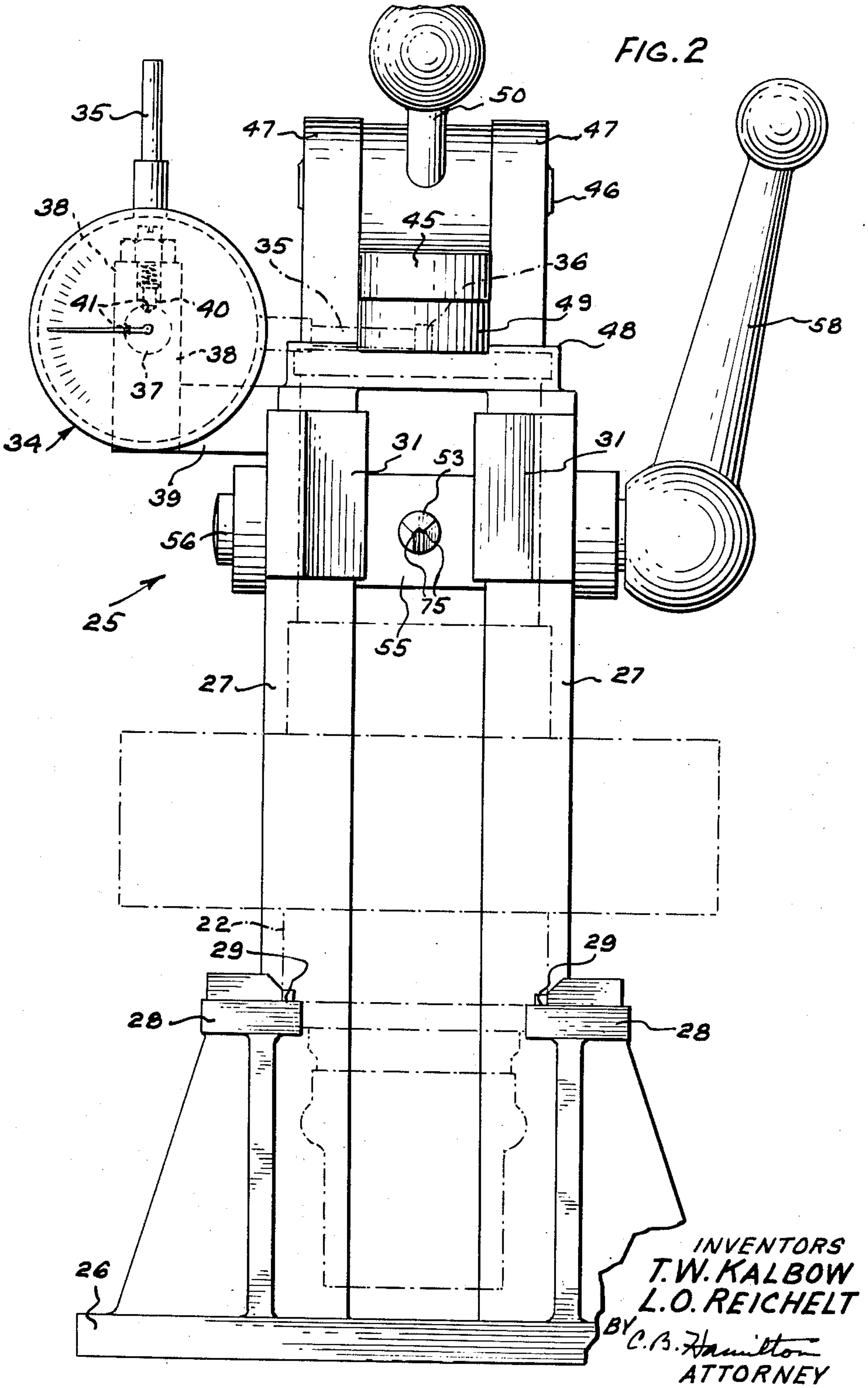
Fig. 2 is a front elevational view of the apparatus.

To indicate the movement of the component 10 from the first position to the second and to an intermediate position, a dial indicator gage 34 is provided having an actuating plunger 35 engageable with an abutment 36 formed on the upper surface of the component 10 in spaced relation to the axis 21. The gage 34 has a pointer and indicia thereon for indicating the movement of the plunger 35. A stud 37 formed on the rear face of the gage 34 is rotatably supported in an aperture in a bearing member 38 forming a portion of a bracket 39 which is secured to one side of one of the vertical frame plates 27 at the upper portion thereof. The gage 34 is adapted to be rotated in the bearing member 38 from an operative position shown in dotted lines in Fig. 2 with the plunger 35 in engagement with the abutment 36 to an inoperative position indicated in full lines to permit the magnetron to be placed into and removed from the apparatus 25. A spring pressed detent 40 is adapted to engage in either of a pair of recesses 41 in the stud 27 to retain the gage in either position.

Clamping means are provided for holding the component 10 in angularly adjusted position while the lines 13 are scribed across the juncture 16 of components 10 and 11. The clamping means includes a clamping member 45 fixed to a rod 46, which is supported in a pair of brackets 47 formed on a plate 48, which in turn is secured to the upper ends of the vertical frame plates 27. The clamping member 45 has a resilient member 49 engageable with the upper end of the component 10 and the member 45 may be actuated by means of an operating lever 50 to apply pressure to the component 10 to clamp the components against each other and the seats 29.

Figure 3:
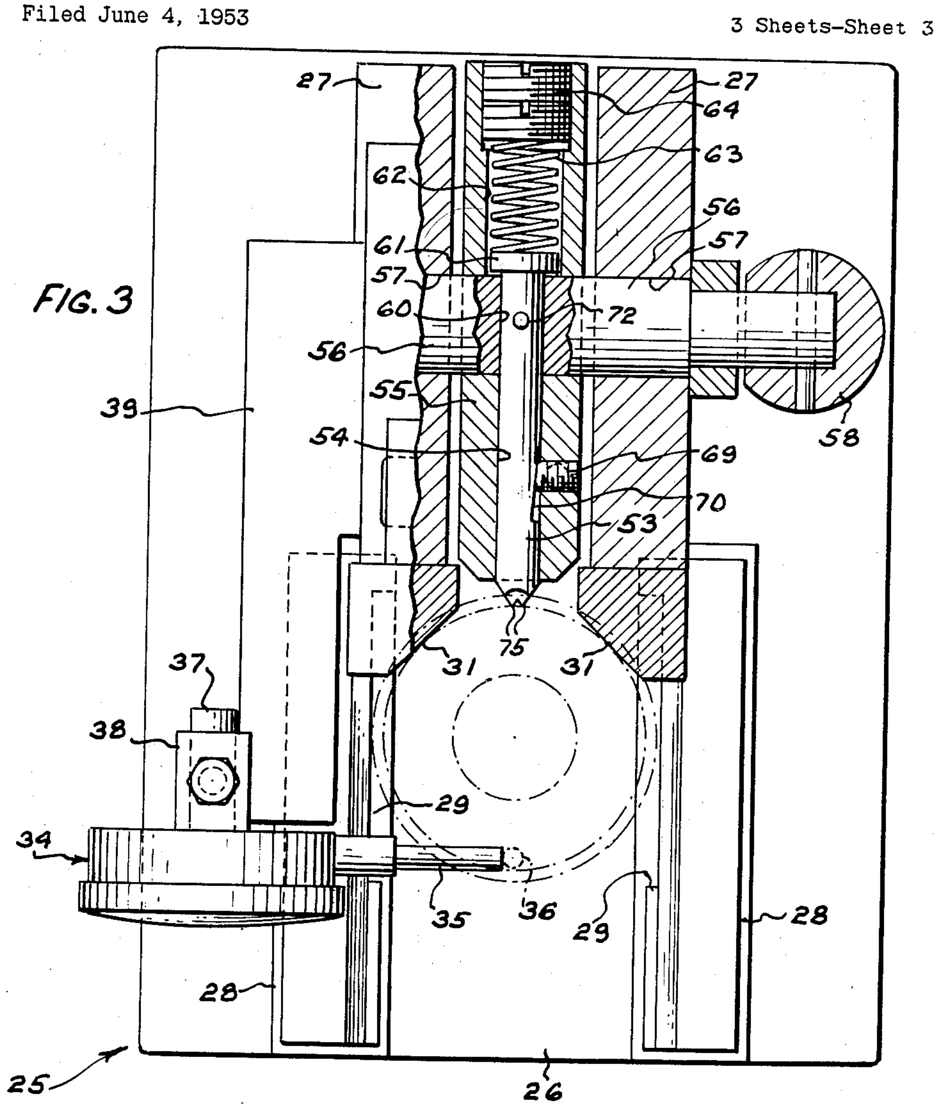
Fig. 3 is a plan view of the apparatus with parts broken away and with parts in section.

A scriber 53 in the form of a cylindrical rod is mounted in a bore 54 of a holder 55, which is supported on a shaft 56, which in turn extends transversely through the holder 55 and is journalled for rocking movement in bearing apertures 57 in the frame plates 27 at an elevation substantially level with the juncture 16 of the components 10 and 11. A lever 58 is fixed to the shaft 56 for imparting oscillation to the scriber 53, which is slidably mounted in the bore 54 and a bore 60 in the shaft 56 and has a head 61 slidable in an enlarged portion 62 of the bore 54. A spring 63 interposed between adjustable screw plugs 64 in the bore 62 and the head 61 of the scriber stresses the scriber forwardly and yieldably maintains it in a forward position. A screw 69 (Figs. 1 and 3) is adjustably mounted in the holder 55 and cooperates with an obliquely disposed flat face 70 formed on the scriber 53 to limit the forward movement thereof to a predetermined position. The screw 69 is secured in adjusted position by a pair of lock screws 71. A pin 72 on the scriber 53 engages in a keyway 73 (Fig. 1) in the shaft 56 to prevent the scriber from turning about its axis. At the forward end thereof the scriber 53 may be provided with one or a pair of sharp points or cutting edges 75 which are adapted to be moved downwardly through an arcuate path to scribe one or a pair of vertical lines 13 (Fig. 5) on the components 10 and 11 and across the juncture 16 formed therebetween.

In the operation of angularly aligning the tuning component 10 relative to the component 11 of the magnetron, the magnetron 12 is placed in the apparatus with the lower pole piece 22 positioned in the nest formed by the seats 29 and with portions of the shells 14 and 15 of the components 10 and 11 in engagement with the gage members 31. The clamping member 45 may be moved into engagement with the upper recessed component 10 to prevent lateral displacement of the magnetron. The dial indicator gage 34 is then rotated and the actuating plunger 35 thereof is moved into engagement with the abutment 36 on the component 10. The component 10 is then manually turned in one direction to a first position with the pins 19 in engagement with one side of the walls of the cavities 20 and this position is noted on the dial indicator gage 34. The component 10 is then turned in the opposite direction to a second position with the pins 19 in engagement with the opposite walls of the cavities 20 and this position is then noted on the dial indicator gage 34. The component 10 is then turned in the first direction to a point midway between the first and second positions as indicated on the dial indicator gage, in which position of the component 10 the pins 19 are in coaxial alignment with the cavities 20. The lever 15 is then actuated to clamp the component 10 against the component 11 and hold the components in fixed relation to each other while the lever 58 is turned to move the scriber 53 downwardly into engagement with the walls of a portion of the components 10 and 11 and scribe a pair of lines 13 across the juncture thereof. The magnetron 12 may then be removed from the apparatus and when the component 10 is subsequently brazed to the component 11 of the magnetron, the coaxial alignment of the pins 19 with the cavities 20 will be obtained by securing the alignment of the portions of the lines 13 on the components 10 and 11.

It is to be understood that the above-described arrangements are simply illustrative of the application of the principles of this invention. Numerous other arrangements may be readily devised by those skilled in the art which will embody the principles of the invention and fall within the spirit and scope thereof.

What is claimed is:

1. A method of angularly aligning a first part on a second part about a predetermined axis about which the parts have abutting concentric cylindrical portions of the same size and one part has a plurality of pins of one diameter extending therefrom into cylindrical cavities of a larger diameter in the other part and with the pins and cavities arranged in a circle concentric with said axis and in spaced relation to each other, which method comprises the steps of supporting said second part in fixed position with said first part superposed thereon, engaging said first part with a device for indicating the angular movement thereof, turning said first part in one direction to a first position with the pins thereon in engagement with the walls on one side of said cavities and noting the reading of the indicating device, turning said first part in the opposite direction to a second position with the pins in engagement with the walls on the opposite sides of the cavities and noting the reading of the indicating device, turning said first part to a position midway between said first and said second positions as indicated by the reading of said indicating device to coaxially align the pins on one part with the cavities of the other part, and scribing a line on said parts across the juncture of said parts.

2. A method of angularly aligning a first part on a second part about a predetermined axis about which the parts have been abutting concentric cylindrical portions of the same size forming a juncture therebetween and one part has a plurality of pins of one diameter extending therefrom into cylindrical cavities of a larger diameter in the other part and with the pins and cavities arranged in a circle concentric with the axis and in spaced relation to each other, which method comprises the steps of supporting said second part in fixed position with said first part superposed thereon, engaging said first part with a device for indicating the angular movement thereof, turning said first part in one direction to a first position with the pins thereon in engagement with the walls on one side of said cavities and noting the reading of the indicating device, turning said first part in the opposite direction to a second position with the pins in engagement with the walls on the opposite sides of the cavities and noting the reading of the indicating device, and turning said first part to a position midway between said first and said second positions as indicated by the reading of said indicating device to coaxially align the pins on one part with the cavities of the other part.

3. A method of angularly aligning a first part on a second part about a predetermined axis in which the parts have aligned cylindrical portions of the same size forming a juncture therebetween and one part has a plurality of pins extending therefrom into cylindrical cavities in the other part and with the pins and cavities arranged in a circle concentric with the axis and in spaced relation to each other, which method comprises the steps of supporting said second part in fixed position with said first part superposed thereon, engaging said first part with a device for indicating the angular movement thereof, turning said first part in one direction to a first position with the pins thereon in engagement with the walls on one side of said cavities and noting the reading of the indicating device, turning said first part in the opposite direction to a second position with the pins in engagement with the walls on the opposite sides of the cavities and noting the reading of the indicating device, turning said first part to a position midway between said first and said second positions as indicated by the reading of said indicating device to coaxially align the pins on one part with the cavities of the other part, clamping the parts against each other in aligned position, and scribing a line on said parts across the juncture of said parts.

4. An apparatus for angularly adjusting a first part on a second part about a predetermined axis relative to which the parts have abutting concentric cylindrical portions of the same size and wherein said first part has an eccentrically disposed abutment and has a limited angular movement relative to the second part comprising means for supporting the first and the second parts in assembled relation with said axis disposed in a substantially vertical position and for holding said second part against rotation about said axis, indicator means on said supporting means engageable with the abutment on said first part for indicating the extent of angular movement of the abutment when said first part is turned in one direction to its limit of movement to a first position and is turned in the opposite direction to its limit of movement to a second position and for indicating a predetermined position intermediate said first and second positions, means on said supporting means for clamping said first part against the second part in angularly adjusted position, and means on said supporting means for scribing a line on said first part and said second part and across the juncture thereof.

5. An apparatus for angularly adjusting a first part on a second part about a predetermined axis relative to which the parts have abutting concentric cylindrical portions of the same size and wherein said first part has an eccentrically disposed abutment and has a limited angular movement relative to the second part comprising a frame having a nest for receiving the second part therein to support the first and the second parts in assembled relation with said axis disposed in a substantially vertical position and for holding said second part against rotation about said axis, indicator means on said frame having a plunger engageable with the abutment on said first part for indicating the extent of angular movement of the abutment when said first part is turned in one direction to its limit of movement to a first position and is turned in the opposite direction to its limit of movement to a second position and for indicating a predetermined position intermediate said first and second positions, a pivoted clamping member on said frame operable for clamping said parts against each other and the nest in angularly adjusted position, a scriber pivotally mounted on said frame in a position to scribe a line on the parts adjacent and across the juncture thereof, and means for actuating said scriber.

6. An apparatus for angularly adjusting a first part on a second part about a predetermined axis relative to which the parts have abutting concentric cylindrical portions of the same size and wherein said first part has an eccentrically disposed abutment and has a limited angular movement relative to the second part comprising a frame having a nest for receiving the second part therein to support the first and the second parts in assembled relation with said axis disposed in a substantially vertical position and for holding said second part against rotation about said axis, indicator means having a plunger, means on said frame mounting said indicator for movement from an inoperative position to permit removal of the parts to and operative position with the plunger in engagement with the abutment on said first part, said indicator being operable to indicate the extent of angular movement of the abutment when said first part is turned in one direction to its limit of movement to a first position and is turned in the opposite direction to its limit of movement to a second position and for indicating a predetermined position intermediate said first and second positions, a movable clamping member supported on said frame for clamping said parts against each other and the nest in angularly adjusted position, a scriber element, a holder for supporting said element for reciprocable movement relative thereto, means on said frame for supporting said holder for oscillatable movement to guide the scriber through a predetermined path into engagement with the parts for scribing a line thereon adjacent to and across the juncture of the parts, resilient means for moving said element forwardly, adjustable means on said holder for limiting the forward movement of said element, and means for oscillating said holder.

References Cited in the file of this patent

UNITED STATES PATENTS

| | | |
|---|---|---|
| 2,388,582 | Sorensen | Nov. 6, 1945 |
| 2,525,068 | Ericson | Oct. 10, 1950 |
| 2,544,934 | Nase | Mar. 13, 1951 |
| 2,636,379 | Van Dorn | Apr. 28, 1953 |